(12) United States Patent
Uchidate

(10) Patent No.: US 10,771,765 B2
(45) Date of Patent: Sep. 8, 2020

(54) INFORMATION PROCESSING APPARATUS, INFORMATION PROCESSING SYSTEM, INFORMATION PROCESSING METHOD, AND STORAGE MEDIUM FOR EMBEDDING TIME STAMPED INFORMATION IN AN IMAGE

(71) Applicant: CANON KABUSHIKI KAISHA, Tokyo (JP)

(72) Inventor: Hikaru Uchidate, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 15/959,678

(22) Filed: Apr. 23, 2018

(65) Prior Publication Data

US 2018/0316904 A1     Nov. 1, 2018

(30) Foreign Application Priority Data

Apr. 28, 2017   (JP) .................................. 2017-089723

(51) Int. Cl.
*H04N 13/167*      (2018.01)
*H04N 13/257*      (2018.01)
(Continued)

(52) U.S. Cl.
CPC ....... *H04N 13/183* (2018.05); *H04N 5/23229* (2013.01); *H04N 5/23232* (2013.01); *H04N 9/7973* (2013.01); *H04N 13/156* (2018.05); *H04N 13/167* (2018.05); *H04N 13/172* (2018.05); *H04N 13/239* (2018.05); *H04N 13/257* (2018.05); *H04N 13/296* (2018.05); *H04N 13/332* (2018.05); *H04N 21/4302* (2013.01); *H04N 21/816* (2013.01); *H04N 21/8146* (2013.01); *H04N 21/8547* (2013.01); *H04N 5/272* (2013.01); *H04N 13/15* (2018.05);
(Continued)

(58) Field of Classification Search
CPC .. H04N 13/183; H04N 13/167; H04N 9/7973; H04N 13/332; H04N 5/23229; H04N 13/257; H04N 2013/0077; H04N 5/272; H04N 2013/0096; H04N 13/172; H04N 13/15; H04N 13/239; H04N 13/296; H04N 13/156; H04N 21/8547; H04N 21/816; H04N 21/8146; H04N 21/4302; H04N 5/23232
USPC ......................................................... 348/47
See application file for complete search history.

(56) References Cited

U.S. PATENT DOCUMENTS 7,707,422 B2 *   4/2010   Shin .................... H04N 1/32154
                                                                713/176
9,986,202 B2 *   5/2018   Hassan ................... H04N 7/035
(Continued)

FOREIGN PATENT DOCUMENTS

JP      2002-281283 A     9/2002
JP      2003-179740 A     6/2003
(Continued)

*Primary Examiner* — Susan E. Hodges
(74) *Attorney, Agent, or Firm* — Canon U.S.A., Inc. I.P. Division

(57) ABSTRACT

An information processing apparatus includes an acquisition unit configured to acquire image data, a generation unit configured to generate information about time as generated additional data, and a replacement unit configured to replace data at a plurality of pixel positions of the acquired image data with the generated additional data.

25 Claims, 9 Drawing Sheets

(51) Int. Cl.
- *H04N 5/232* (2006.01)
- *H04N 13/183* (2018.01)
- *H04N 13/332* (2018.01)
- *H04N 9/797* (2006.01)
- *H04N 21/81* (2011.01)
- *H04N 21/43* (2011.01)
- *H04N 13/239* (2018.01)
- *H04N 13/156* (2018.01)
- *H04N 13/172* (2018.01)
- *H04N 21/8547* (2011.01)
- *H04N 13/296* (2018.01)
- *H04N 13/00* (2018.01)
- *H04N 5/272* (2006.01)
- *H04N 13/15* (2018.01)

(52) U.S. Cl.
CPC ............... *H04N 2013/0077* (2013.01); *H04N 2013/0096* (2013.01)

(56) References Cited

U.S. PATENT DOCUMENTS

| | | | | |
|---|---|---|---|---|
| 2009/0231455 | A1* | 9/2009 | Emery | H04N 1/32203 348/222.1 |
| 2010/0091139 | A1* | 4/2010 | Sako | G06T 11/00 348/231.99 |
| 2012/0081577 | A1* | 4/2012 | Cote | H04N 19/80 348/231.99 |
| 2015/0189190 | A1* | 7/2015 | Fung | H04N 13/106 348/222.1 |
| 2017/0323479 | A1* | 11/2017 | Mokuya | G06T 19/00 |

FOREIGN PATENT DOCUMENTS

| | | |
|---|---|---|
| JP | 2008-167348 A | 7/2008 |
| JP | 2009-100296 A | 5/2009 |

* cited by examiner

INFORMATION PROCESSING APPARATUS, INFORMATION PROCESSING SYSTEM, INFORMATION PROCESSING METHOD, AND STORAGE MEDIUM FOR EMBEDDING TIME STAMPED INFORMATION IN AN IMAGE

BACKGROUND

Field of the Disclosure

The present disclosure is directed to a technique for adding predetermined information to an image.

Description of the Related Art

Mixed reality (MR) technology for seamlessly mixing the real world and a virtual world has recently been known. One MR technique uses a video see-through head-mounted display (HMD). In this technique, an image of an object that approximately matches an object observed from the positions of the eyes of an HMD user is captured by a video camera or the like, and the user can observe a video created by superimposing computer graphics (CG) data on the captured video.

To accurately obtain a position where the CG data is rendered from the captured video, it is important that captured videos or a captured video and other data (for example, sensor data about positions or orientations) be temporally synchronized with each other by taking, for example, a delay caused by performing image processing on the video input into consideration. Japanese Patent Application Laid-Open No. 2008-167348 discusses an image processing apparatus, which issues identification information per frame, more specifically, time stamp information indicating time of image capturing per frame. In this technique, an individual item of time stamp information issued is embedded in one predetermined pixel of a frame of video data.

However, this technique discussed in Japanese Patent Application Laid-Open No. 2008-167348 is limited in that the embedment of additional information (for example, a time stamp) in one predetermined pixel of image data of an individual frame of video data deteriorates image quality of the video.

SUMMARY

The present disclosure is directed to reducing deterioration of image quality of image data when additional information is embedded (added) in image data.

According to an aspect of the present disclosure, an information processing apparatus includes an acquisition unit configured to acquire image data, a generation unit configured to generate information about time as additional data, and a replacement unit configured to replace data at a plurality of pixel positions of the acquired image data with the generated additional data.

Further features of the present disclosure will become apparent from the following description of exemplary embodiments with reference to the attached drawings.

DESCRIPTION OF THE EMBODIMENTS

Figure 1:
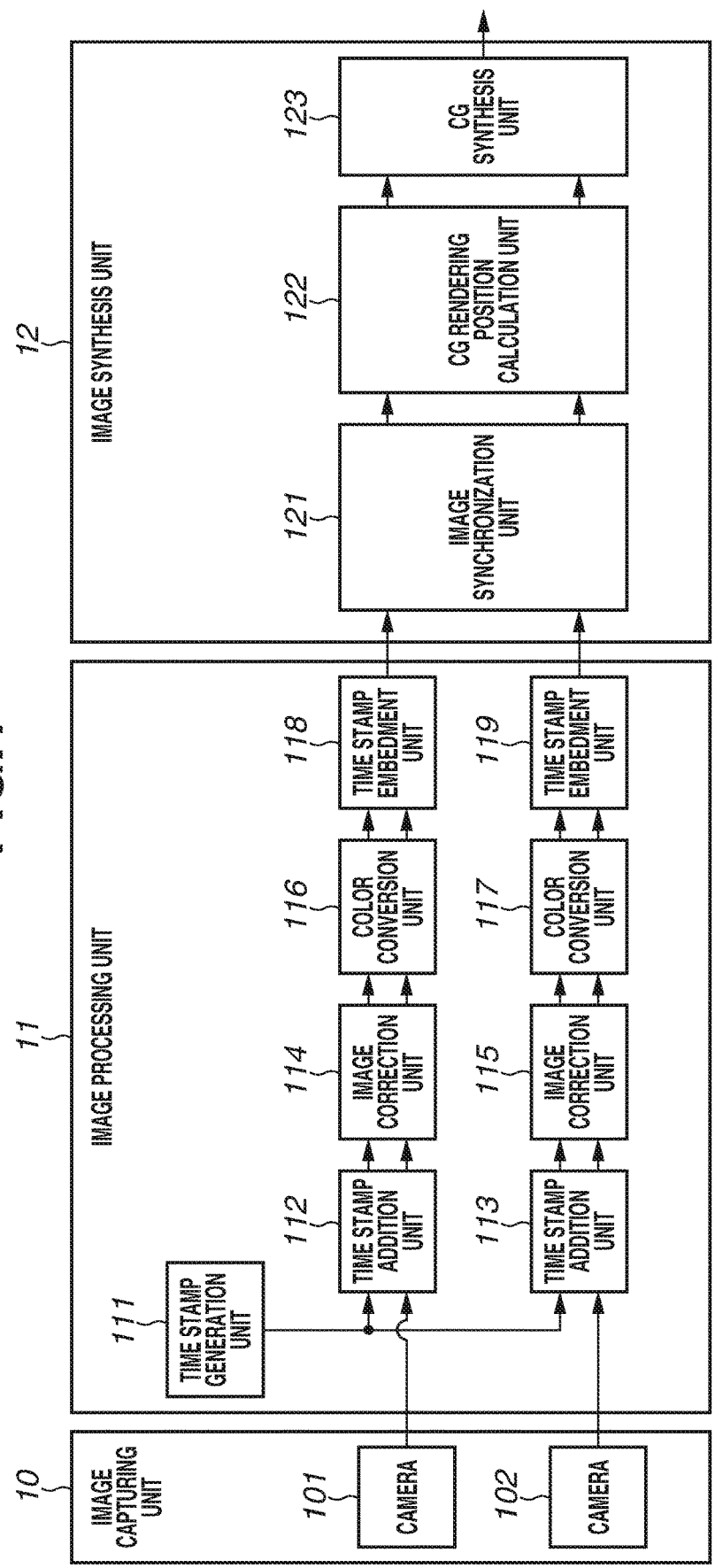
FIG. 1 is a block diagram illustrating a configuration of an information processing system according to a first exemplary embodiment.

Hereinafter, a first exemplary embodiment of the present disclosure will be described in detail with reference to the accompanying drawings. FIG. 1 is a block diagram illustrating a configuration of an information processing system according to the first exemplary embodiment. As illustrated in FIG. 1, the information processing system according to the present exemplary embodiment includes three main units, which are an image capturing unit 10 that includes cameras and generates captured videos, an image processing unit 11 that performs image processing on the captured videos, and an image synthesis unit 12 that calculates, based on contents of the captured videos, the position of computer graphics (CG) data to be superimposed and generates a synthesized video (synthesized image data).

The image capturing unit 10 and the image processing unit 11 are included in a head-mounted display (HMD) corresponding to an information processing apparatus in the present information processing system. However, the image synthesis unit 12 is included in a personal computer (PC). The HMD and the PC are connected to each other via a wired or wireless system and respectively include a hardware configuration such as a central processing unit (CPU), a read-only memory (ROM), and a random access memory (RAM). Each of the HMD and the PC realizes, for example, its functional configuration to be described below or performs its processing illustrated in a flowchart to be described below by causing its CPU to execute a program stored in its ROM or the like. The RAM has a storage area that functions as a work area in which the CPU loads and executes programs, and the ROM has a storage area in which programs and the like executed by the CPU are stored. While the present exemplary embodiment assumes that the image synthesis unit 12 is included in the PC, the image synthesis unit 12 can be included in the HMD. In such a case, the entire configuration of the present information processing system is realized by the single HMD. With the above configuration, a user who is wearing the HMD including the image capturing unit 10 around his/her head can observe a video created by superimposing CG data on a video in the real space through a display inside the HMD, and can feel a mixed reality (MR) in which the real world and a virtual world are mixed in real time.

The image capturing unit 10 includes cameras 101 and 102 using a semiconductor element such as a charge-coupled device (CCD) or a complementary metal-oxide-semiconductor (CMOS) sensor. The cameras 101 and 102 capture an object image in the real space per frame with a period of 10 to 100 ms. The cameras 101 and 102 are cameras corresponding to the left and right eyes of a user, respectively. The cameras 101 and 102 can be different camera devices or can operate at different frame rates. The present exemplary embodiment will be described assuming that both the cameras 101 and 102 operate at 60 Hz (with a period of 16.67 ms).

The cameras 101 and 102 output, along with image data, signals indicating a video display period of a single screen such as a vertical synchronizing signal, a horizontal synchronizing signal, and a blanking signal, as a captured video. An individual apparatus (PC) that receives the input information from the cameras detects a start of a video frame by referring to the vertical synchronizing signal, detects a start of the lines in an image in the single frame by referring to the horizontal synchronizing signal, and detects whether an image area is an effective image area by referring to the blanking signal. In this way, the apparatus receives the input information as a captured video.

The image processing unit 11 includes a time stamp generation unit 111 that generates time stamps for synchronizing the videos captured by the cameras 101 and 102 and time stamp addition units 112 and 113 for adding time stamps based on input timing of the captured videos. In addition, the image processing unit 11 includes image correction units 114 and 115 that perform image correction on the captured videos and timing adjustment of the added time stamps and color conversion units 116 and 117 that perform color conversion processing on the captured videos on which image correction has been performed. Further, the image processing unit 11 includes time stamp embedment units 118 and 119 that embed the time stamps in the captured videos from the cameras 101 and 102, respectively.

The time stamp generation unit 111 internally measures time at all times and generates information about the current time as a time stamp. The time stamp generation unit 111 can measure time in any way. For example, the time stamp generation unit 111 can include a counter and measure time at a predetermined cycle, or can include a timer based on a CPU or the like. Alternatively, the time stamp generation unit 111 can use identification (ID) information incremented based on an external reference signal.

Figure 2:
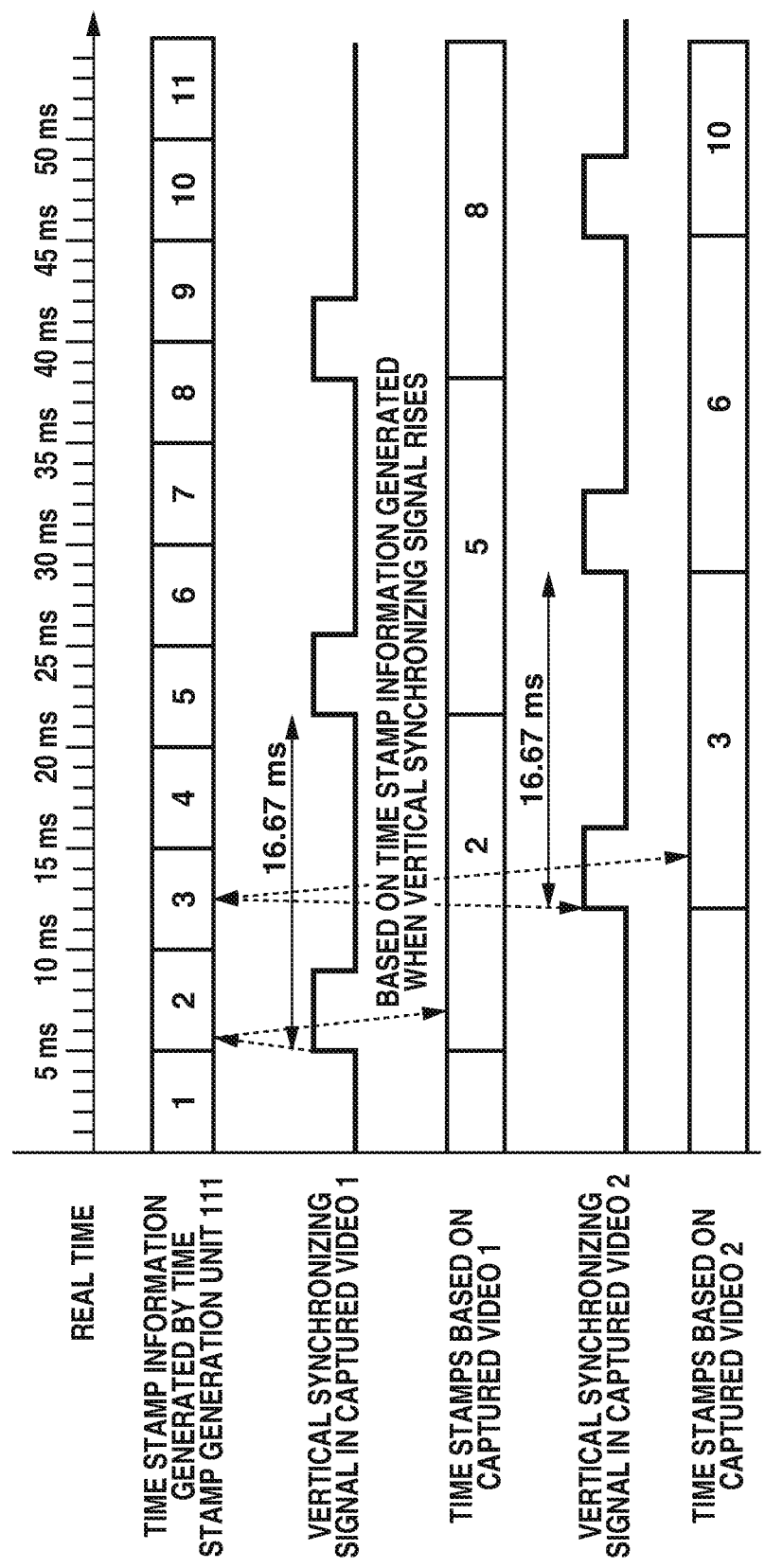
FIG. 2 is a timing chart illustrating an operation of adding time stamps according the first exemplary embodiment.

The time stamp addition units 112 and 113 have a function of acquiring captured videos from the cameras 101 and 102. When acquiring video data of such captured videos, the time stamp addition units 112 and 113 acquire time stamps generated by the time stamp generation unit 111 (information about the time of the acquisition) and adds the time stamps to the captured videos. FIG. 2 is a timing chart illustrating an operation of adding time stamps by the time stamp addition units 112 and 113. The following description will be made assuming that the time stamp generation unit 111 measures time by incrementing information per 5 ms in real time. A captured video 1 is a captured video input by the camera 101, and a vertical synchronizing signal in the captured video 1 is illustrated in FIG. 2. Frames are switched at a rising edge of the vertical synchronizing signal in the captured video 1, and the period between two rising edges is 16.67 ms. In FIG. 2, when the time stamp addition unit 112 detects a rising edge of the vertical synchronizing signal in the captured video 1, the time stamp addition unit 112 acquires time stamp information generated by the time stamp generation unit 111 at the time of the detection.

In the example in FIG. 2, the time stamp information at the first rising edge of the vertical synchronizing signal in the captured video 1 indicates "2", and the next rising edge of the vertical synchronizing signal indicates "5". In this way, the time stamp addition unit 112 acquires the subsequent time stamp information from the time stamp generation unit 111 each time the vertical synchronizing signal in the captured video 1 rises. The time stamp addition unit 113 operates in the same way as the time stamp addition unit 112, except that the time stamp addition unit 113 acquires time stamps on the basis of a captured video 2 input by the camera 102.

As described above, the time stamp addition units 112 and 113 acquire time stamp information from the time stamp generation unit 111 on the basis of the timing at which captured videos are input by the cameras 101 and 102, and issue the time stamp information associated with the respective captured videos. While the present exemplary embodiment has been described assuming that the time stamp addition units 112 and 113 acquire time stamp information at the rising edges of the vertical synchronizing signals in the respective captured videos, the present disclosure is not limited to this configuration. For example, the time stamp addition units 112 and 113 can be configured to acquire time stamp information on the basis of the respective horizontal synchronizing signals or either one of the vertical synchronizing signals in the captured videos 1 and 2. Namely, as long as the present exemplary embodiment includes a unit that can determine the timing at which at least one of the captured videos is input, the present exemplary embodiment can be realized.

The image correction units 114 and 115 have a function of performing image correction on input captured videos and a function of delaying time stamp information by the processing based on the image correction. For example, the image correction function is a pixel defect correction function of correcting pixel defects obtained from a camera. When a pixel array of the cameras 101 and 102 is the Bayer array, the image correction function is Bayer interpolation processing for generating red-green-blue (RGB) signals from Bayer data. For example, the image correction function is a shading correction function of correcting optical characteristics of captured videos. Alternatively, the image correction function can be a combination of the above processing.

Figure 3:
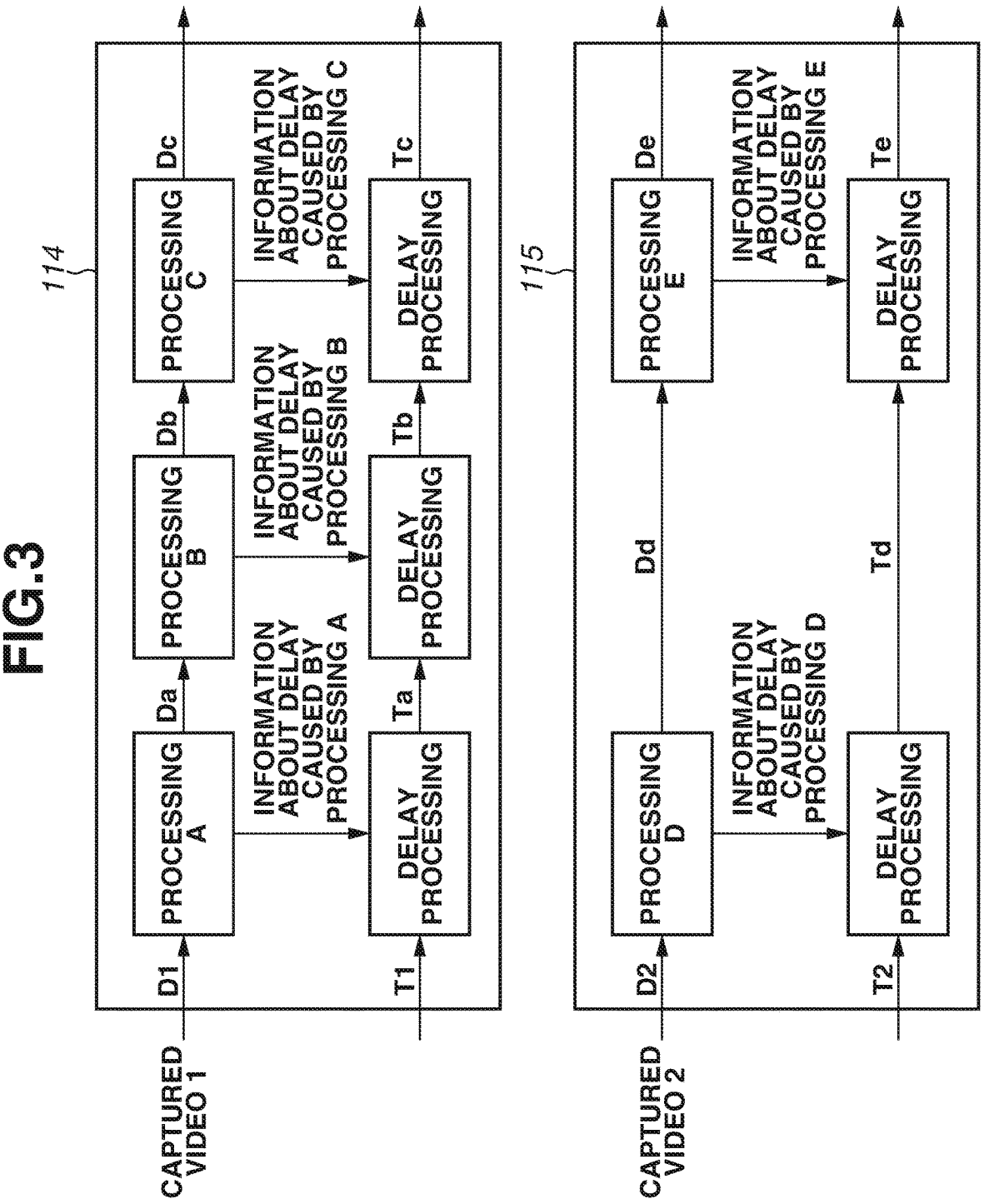
FIG. 3 is a schematic block diagram illustrating a processing flow of an image correction unit according to the first exemplary embodiment.

FIG. 3 is a schematic block diagram illustrating a processing flow of the image correction units 114 and 115 according to the first exemplary embodiment. The present exemplary embodiment will be described assuming that the image correction unit 114 performs processing A, processing B, and processing C on the captured video 1 as illustrated in FIG. 3. Namely, the contents of the processing performed by the image correction unit 114 are not particularly limited. In addition, in the present exemplary embodiment, the image correction units 114 and 115 have different image correction functions.

Figure 4:
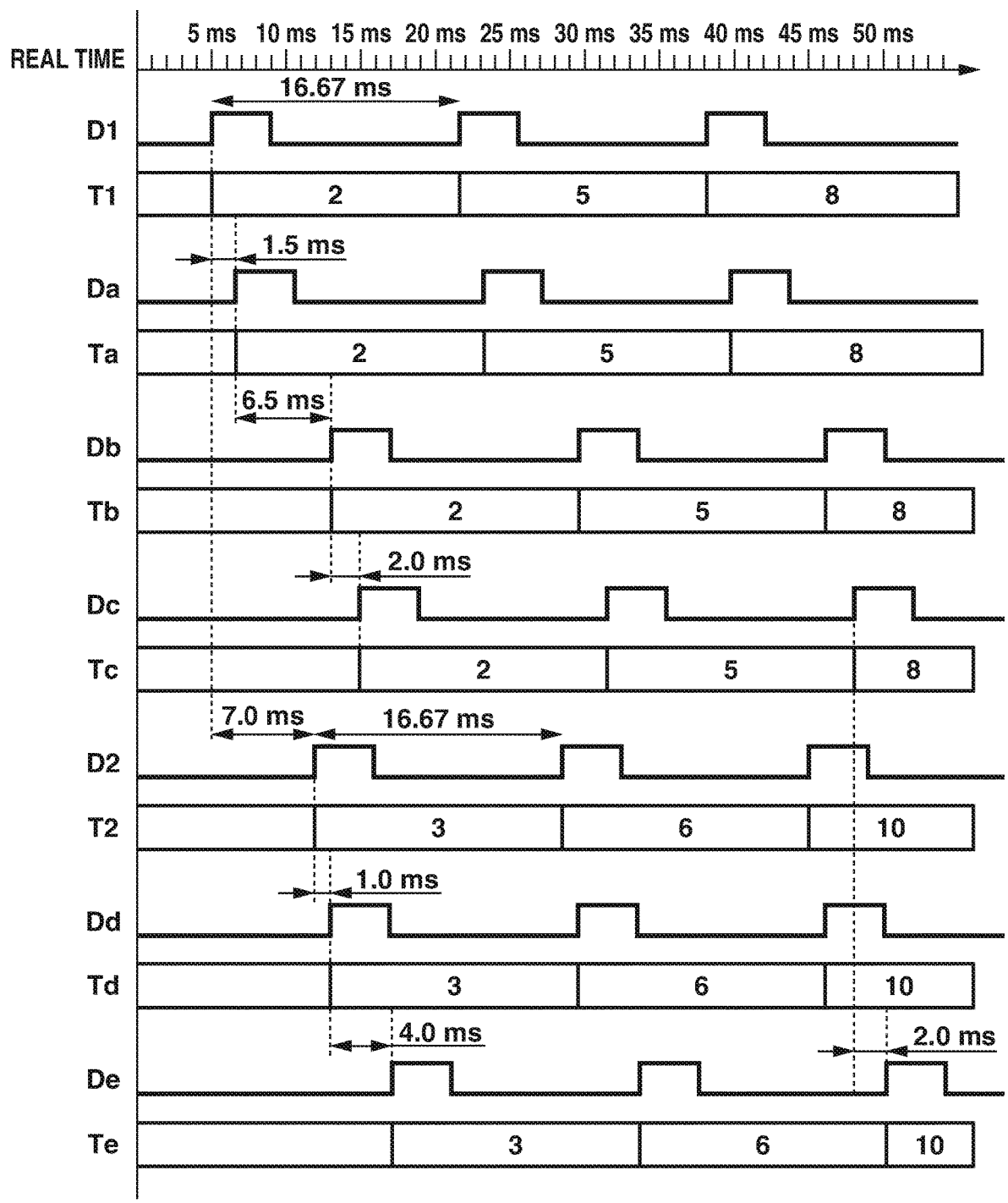
FIG. 4 is a timing chart illustrating change of captured videos and time stamp information according to the first exemplary embodiment.

FIG. 4 is a timing chart illustrating how captured videos and time stamp information are changed by the image correction units 114 and 115. In FIG. 3, the captured video 1 and the time stamp information input to the image correction unit 114 are illustrated as inputs D1 and T1, respectively, and the same inputs D1 and T1 are illustrated in the timing chart in FIG. 4. The captured video and the time stamp information are input to the image correction unit 114 at the same timing.

In FIG. 4, captured videos Da, Db, and Dc are the captured videos that have passed through the processing A, B, and C in FIG. 3, respectively. As illustrated in FIG. 4, the processing A outputs the captured video to a downstream processing block B after a processing delay of 1.5 ms. In this case, a corresponding delay processing block receives information about the processing delay caused by the processing A in the processing block A, performs delay processing on time stamp information T1, and outputs time stamp information Ta.

The same holds true for the processing block B. The processing B outputs the captured video to a downstream processing block C after a processing delay of 6.5 ms. Then, a corresponding delay processing block generates time stamp information Tb from the time stamp information Ta on the basis of the delay information from the processing block B. The same holds true for the processing C, the processing D, and the processing E. Herein, as illustrated in FIG. 4, the image correction unit 114 delays the captured video 1 by 10.0 ms (1.5+6.5+2.0=10.0), and the image correction unit 115 delays the captured video 2 by 5.0 ms (1.0+4.0=5.0).

In the present exemplary embodiment, each time processing is performed on a captured video, corresponding time stamp information is delayed by the amount of delay caused by the processing, and the time stamp information is output by the image correction units 114 and 115 in synchronization with switching of frames of the captured video. Namely, the image correction units 114 and 115 output the time stamp information, which the time stamp addition units 112 and 113 have added in association with the individual frames of the captured videos, while maintaining the relationship between the time stamp information and the individual frames.

The color conversion units 116 and 117 perform color space conversion by performing calculation processing for converting RGB components of the input captured videos 1 and 2 into YUV components. Generally, this conversion from RGB representation to YUV representation is performed by using the following conversion expressions (mathematical expressions 1).

$$Y=0.299 \times R+0.587 \times G+0.114 \times B$$

$$U=-0.169 \times R-0.331 \times G+0.500 \times B$$

$$V=0.500 \times R-0.419 \times G-0.081 \times B \quad \text{(Mathematical expressions 1)}$$

The above conversion expressions generally use a luminance signal Y and color difference signals U and V. While human eyes are sensitive to change of a luminance signal, they are insensitive to change of a color difference signal. Thus, the color conversion units 116 and 117 can be configured to perform calculation in YUV422 format, YUV411 format, or the like in which UV data is compressed.

Figure 5:
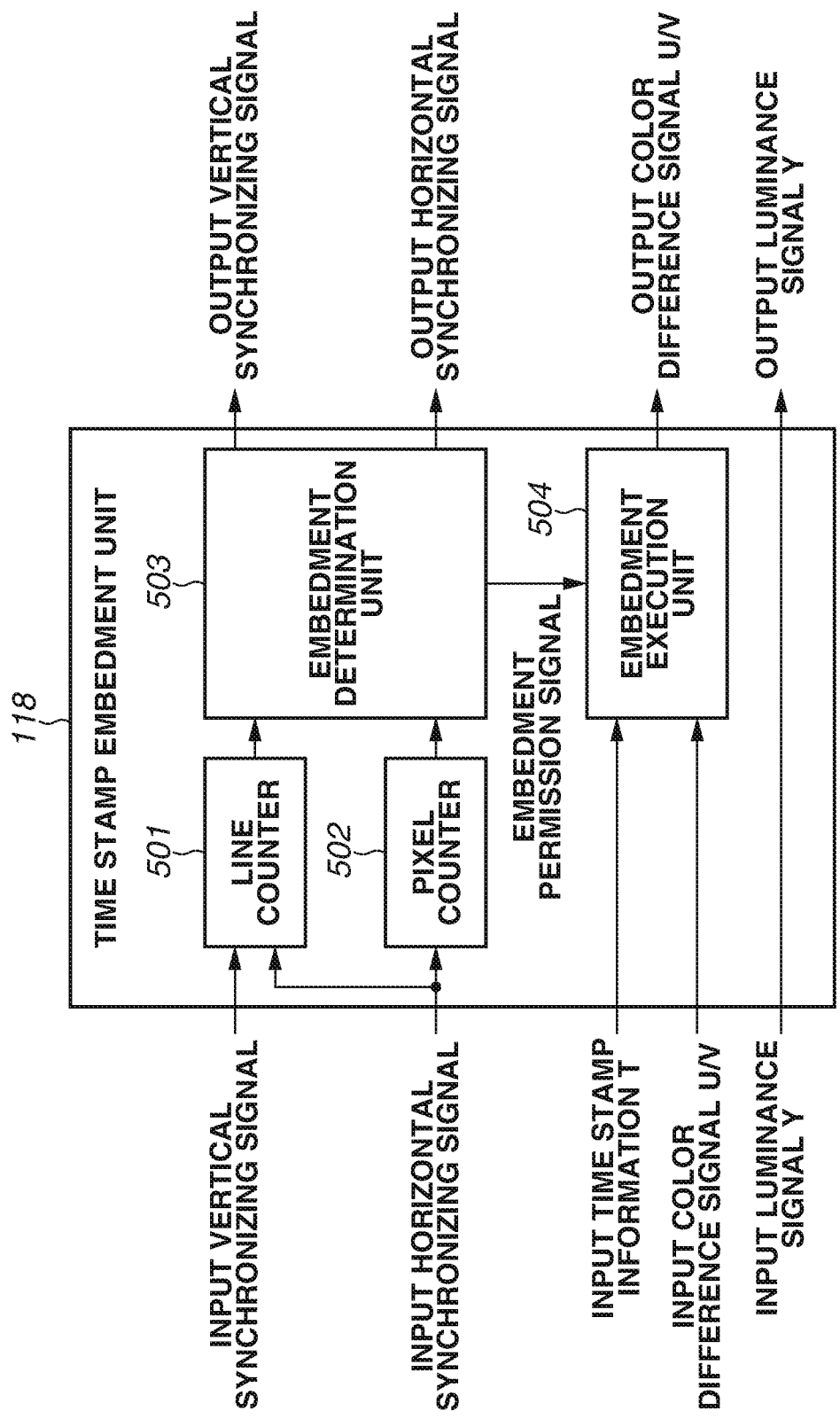
FIG. 5 is a block diagram illustrating a functional configuration of a time stamp embedment unit according to the first exemplary embodiment.

The time stamp embedment units 118 and 119 according to the present exemplary embodiment will be described. FIG. 5 is a block diagram illustrating a functional configuration of the time stamp embedment unit 118 according to the first exemplary embodiment. Since the time stamp embedment unit 119 has the same configuration as that of the time stamp embedment unit 118, detailed description thereof will be omitted.

The time stamp embedment unit 118 includes a line counter 501, a pixel counter 502, an embedment determination unit 503, and an embedment execution unit 504. The line counter 501 counts pixel positions in the vertical direction per frame of a captured video. The pixel counter 502 counts pixel positions in the horizontal direction per frame of a captured video. The embedment determination unit 503 issues an embedment permission signal to the embedment execution unit 504 on the basis of the pixel positions counted by the line counter 501 and the pixel counter 502. The embedment execution unit 504 replaces an input color difference signal U/V with an input time stamp information T on the basis of the embedment permission signal input by the embedment determination unit 503.

Figure 6:
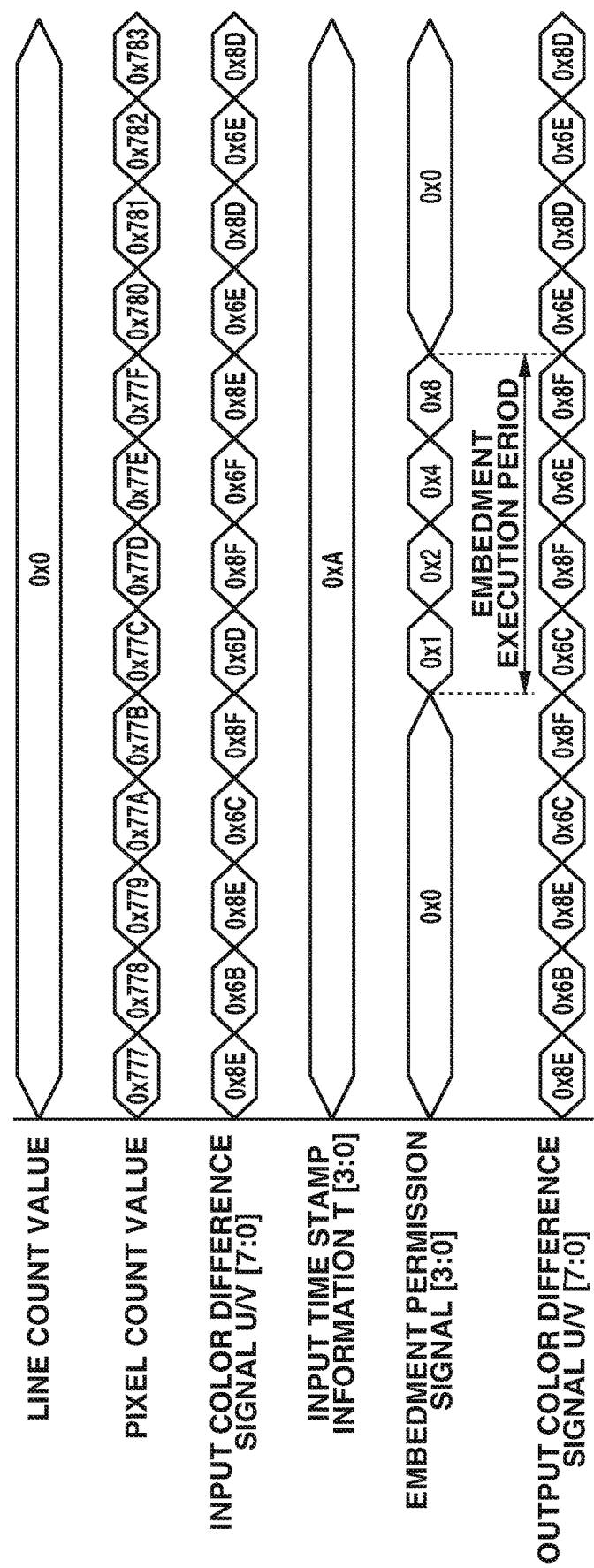
FIG. 6 is a timing chart illustrating a time stamp embedment operation according to the first exemplary embodiment.

FIG. 6 is a timing chart illustrating a time stamp embedment operation performed by the time stamp embedment unit 118 according to the first exemplary embodiment. A line count value and a pixel count value are the count values output by the line counter 501 and the pixel counter 502, respectively. An input color difference signal U/V indicates the color difference signals among the YUV signals input by the color conversion unit 116. The input time stamp information T is time stamp information that synchronizes with the captured video output by the upstream image correction unit 114.

In this case, an embedment permission signal output by the embedment determination unit 503 is a 4-bit signal and has the same bit width as the input time stamp information T. The embedment execution unit 504 recognizes the individual bits of an embedment permission signal as an enable signal of the individual bits of the input time stamp information, and replaces the least significant bit (LSB) of the input color difference signal with the input time stamp information T having a bit specified by the embedment permission signal.

This processing will be described with reference to FIG. 6. When the embedment permission signal is "0x1", the embedment execution unit 504 recognizes the LSB of the 4-bit embedment permission signal as an enable signal. Namely, the LSB signal of the input time stamp information T is determined to be an embedment target bit and replaces the LSB of the input color difference signal. In this case, since the input time stamp information T=0xA, when the embedment permission signal is 0x1, the embedment target bit is 0x0. In FIG. 6, since the corresponding input color difference signal is 0x6D, the LSB is replaced with the embedment target bit 0x0. Consequently, since 0x6D is changed to 0x6C, this value is output as an output color difference signal. Subsequently, on the basis of the enable bit of an embedment permission signal, the embedment execution unit 504 embeds the input time stamp information in a plurality of pixels of the color difference signal. In FIG. 6, 4-bit time stamp information is dispersedly embedded in four different pixel positions of an image. The time stamp information is embedded in the horizontal direction from a position whose horizontal position is 0x77C and vertical position is 0x0.

The image synthesis unit 12 has a function of superimposing CG data on captured videos input by the image processing unit 11 and outputting a resultant video as a video to be displayed. The image synthesis unit 12 includes an image synchronization unit 121 that synchronizes a plurality of captured videos (the videos captured by the cameras 101 and 102), which have been input at different timings. In addition, the image synthesis unit 12 includes a CG rendering position calculation unit 122 that calculates CG rendering positions by analyzing the plurality of synchronized captured videos and a CG synthesis unit 123 that superimposes relevant CG contents on the basis of the calculated CG rendering positions.

Figure 7:
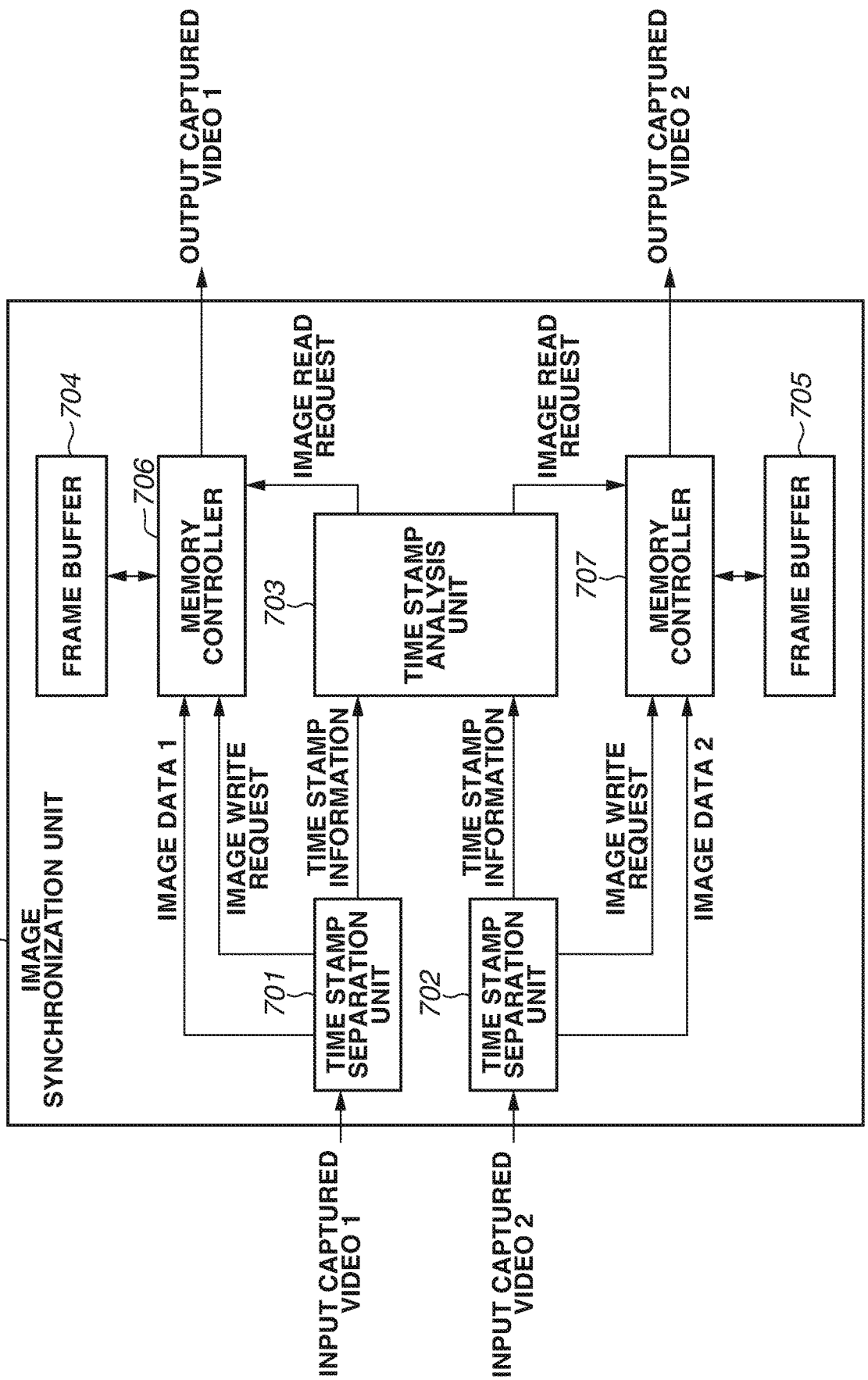
FIG. 7 is a block diagram illustrating a functional configuration of an image synchronization unit according to the first exemplary embodiment.

When a plurality of captured videos are input at different timings because of a configuration of an internal path of the image processing unit 11, the image synchronization unit 121 synchronizes images by comparing time stamp information embedded inside frames (image data) of the videos. FIG. 7 is a block diagram illustrating a functional configuration of the image synchronization unit 121 according to the first exemplary embodiment. The image synchronization unit 121 includes time stamp separation units 701 and 702 that separate the time stamp information embedded in the input captured videos. The image synchronization unit 121 includes a time stamp analysis unit 703 that analyzes the separated time stamp information in the plurality of captured videos and controls image transfer on the basis of the analyzed time stamp information. Further, the image synchronization unit 121 includes frame buffers 704 and 705 that buffer the captured videos and memory controllers 706 and 707 that control writing and reading in and from the respective frame buffers in response to requests.

The time stamp separation units 701 and 702 receive captured videos and separate the time stamp information from the image data. On the basis of information extracted from predetermined image positions and bit positions of the captured videos, the time stamp separation units 701 and 702 restore the time stamp information. In the present exemplary embodiment, time stamp information is embedded in a plurality of pixels and color difference signals in each frame (image data) of the captured videos, more specifically, in the LSBs of the color difference signals at four pixel positions per frame. Thus, image quality of the image data is not significantly deteriorated after the time stamp information has been extracted. The bit-position image data at the pixel positions in which the time stamp information has been embedded can be left as it is. Alternatively, the image data can be replaced with "0×0" or "0×1".

After separating the time stamp information from the image data, the time stamp separation units 701 and 702 respectively issue image write requests to the memory controllers 706 and 707 and transfer the image data. Simultaneously, the time stamp separation units 701 and 702 transmit the time stamp information to the time stamp analysis unit 703.

Figure 8:
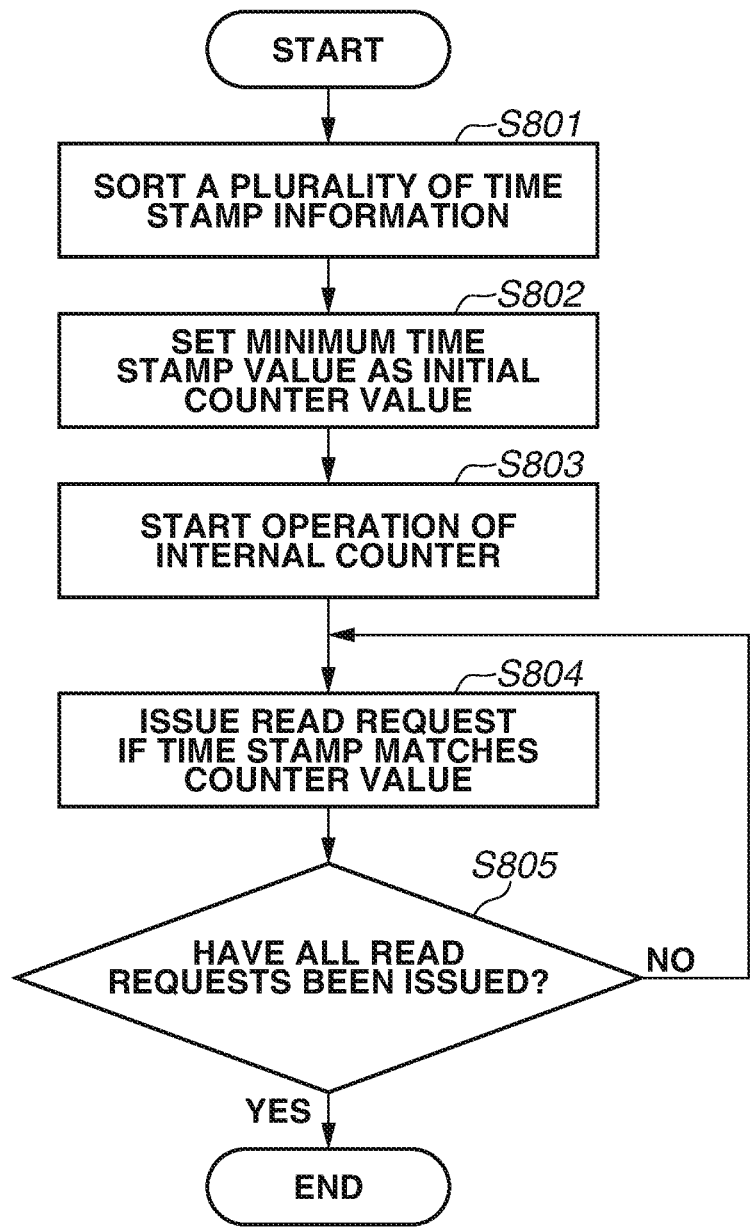
FIG. 8 is a flowchart illustrating an operation of a time stamp analysis unit according to the first exemplary embodiment.

The time stamp analysis unit 703 issues image read requests to the memory controllers 706 and 707 from the plurality of input time stamp information. FIG. 8 is a flowchart illustrating an operation of the time stamp analysis unit 703. First, in step S801, the time stamp analysis unit 703 sorts the plurality of time stamp information. Next, in step S802, the time stamp analysis unit 703 sets the oldest time stamp information (the minimum value in the present exemplary embodiment) as an initial value of an internal counter.

In step S803, the internal counter starts to operate from the initial value set in step S802. This counter operates in the same cycle as that of the time stamp generation unit 111 included in the image processing unit 11. In step S804, the time stamp analysis unit 703 compares the sorted time stamp information with the counter value of the internal counter. The time stamp analysis unit 703 begins the comparison from the minimum time stamp value. In a case where the time stamp analysis unit 703 determines that the counter value matches the time stamp information, the time stamp analysis unit 703 issues a read request. Then, in step S805, the time stamp analysis unit 703 determines whether a read request has been issued for each item of time stamp information. In a case where there is any time stamp information for which a read request has not been issued (No in step S805), the operation returns to step S804. By performing this step per frame, the time stamp analysis unit 703 can accurately associate a plurality of captured videos with each other, which have been input at different timings, and correct the time lag.

The CG rendering position calculation unit 122 analyzes the images in the plurality of input captured videos and calculates CG rendering positions. Since this calculation is performed by using the plurality of captured videos, the more accurately the time relationship between videos is determined, the more accurately the rendering positions will be calculated. In addition, a captured video has an area in which no CG data is rendered. Since this area is an area viewed by a human, it is desirable that image deterioration be unnoticeable. In the present exemplary embodiment, since the image synchronization unit 121 inputs a plurality of captured videos at accurate timings on the basis of time stamps, the CG rendering position calculation unit 122 can calculate the CG rendering positions highly accurately. In addition, since the time stamp embedment unit 118 performs embedment processing on a plurality of pixels and color difference signals to which human eyes are insensitive, image deterioration can be reduced.

The CG synthesis unit 123 renders CG data on the captured videos on the basis of the rendering position information obtained by the CG rendering position calculation unit 122. In this way, a mixed reality video in which CG contents are displayed at appropriate positions of captured videos can be created.

In the present exemplary embodiment, the embedment processing is performed on a plurality of pixels and color difference signals. However, the embedment processing may not be performed on the color difference signals, as long as the embedment processing is performed on a plurality of pixels. Alternatively, the embedment processing may not be performed on a plurality of pixels (may be performed on one pixel), as long as the embedment processing is performed on the color difference signals. Namely, the present exemplary embodiment can reduce deterioration of the image quality of captured videos by embedding time stamp information about a plurality of input captured videos in a plurality of pixel positions. In addition, in the present exemplary embodiment, since the time stamp information is embedded in the color difference signals generated by the color conversion units, deterioration of the image quality can be reduced further.

In the present exemplary embodiment, the time information (time stamp information), which serves as information that identifies (determines) individual frames, is embedded to synchronize a plurality of captured videos. However, any information that identifies individual frames can be used in place of the time information. For example, the present exemplary embodiment is widely applicable to a case in which general additional information (general additional data) that is different from the time information and to be assocaited with individual frames are embedded in image data frames (added in such a manner that the general additional information is hidden).

Further, in the present exemplary embodiment, when additional information of a predetermined number of bits (4-bit time stamp information) is embedded, the additional information is dispersedly embedded at pixel positions of the predetermined number (four positions). However, alternatively, the additional information can be embedded at two or three positions, for example. However, it is preferable that the additional information of a predetermined bit number be dispersedly embedded at pixel positions of the predetermined number, and that the additional information be embedded at the LSB at each pixel position, in terms of further reduction of deterioration of the image quality.

Furthermore, in a case where the additional information is dispersedly embedded at a plurality of positions, it is preferable that the plurality of positions be consecutive pixels in a predetermined direction. Namely, when the information processing system acquires embedded additional information while reading image data in a predetermined direction (raster direction), if the additional information is consecutive in the predetermined direction, the additional information is acquired quickly. Thus, this configuration is advantageous in efficient use of a memory cache.

Now, a second exemplary embodiment of the present disclosure will be described. The second exemplary embodiment includes components, which have already been described in the first exemplary embodiment. Thus, these components will be denoted by the same reference numerals, and description thereof will be omitted.

Figure 9:
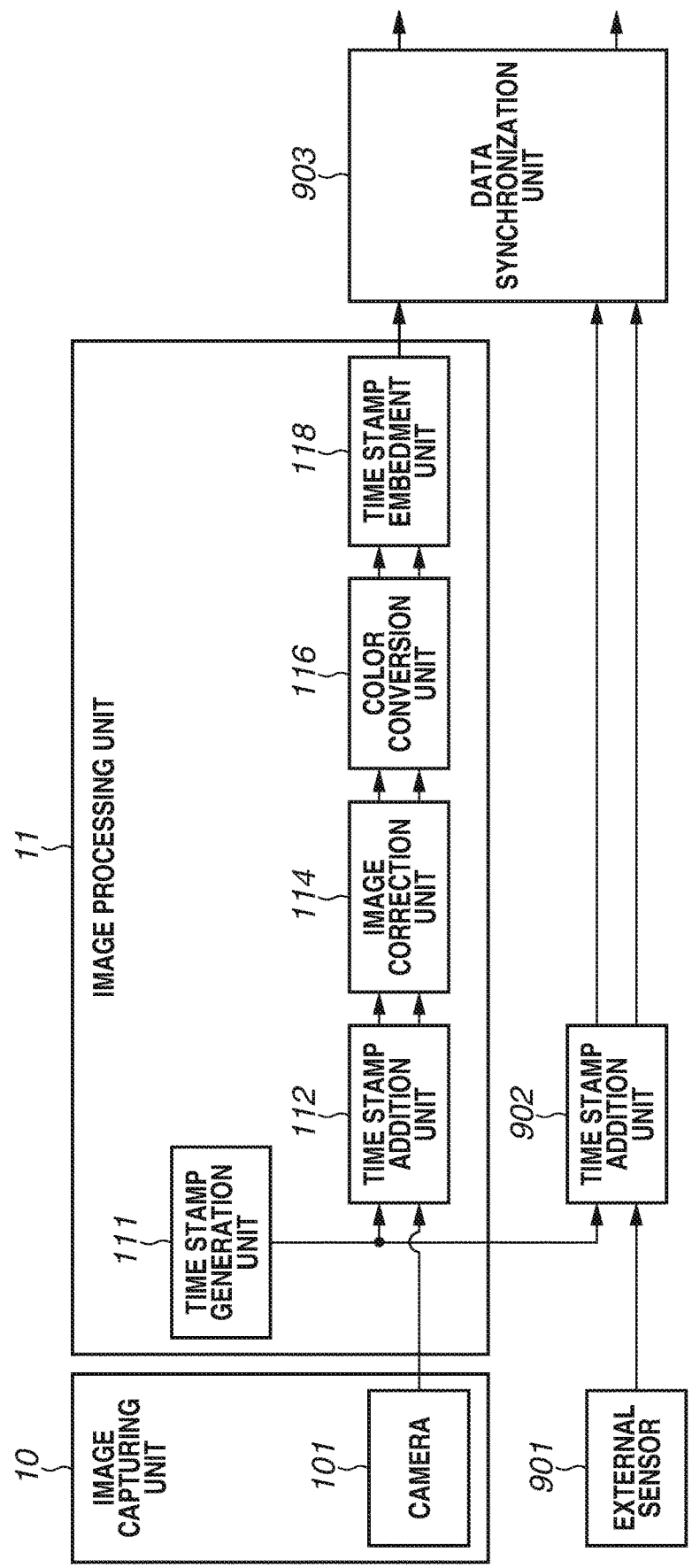
FIG. 9 is a block diagram illustrating a configuration of an information processing system according to a second exemplary embodiment.

FIG. 9 is a block diagram illustrating a configuration of an information processing system according to the second exemplary embodiment. As in the first exemplary embodiment, the information processing system according to the present exemplary embodiment includes three main units, which are an image capturing unit 10 that includes a camera and generates a captured video, an image processing unit 11 that performs image processing an the captured video. However, unlike the first exemplary embodiment, the information processing system according to the second exemplary embodiment further includes an external sensor 901, a time stamp addition unit 902 for adding a time stamp based on data input by the external sensor 901, and a data synchronization unit 903 that achieves data synchronization between the captured video and the data from external sensor.

The external sensor 901 corresponds to a sensor other than the camera device. For example, the external sensor 901 is an audio sensor that acquires audio data or a position and orientation sensor that is included in the image capturing unit 10 and that senses a direction and an orientation of the camera device. Namely, any sensor that needs to be synchronized with the camera device can be used as the external sensor 901.

The time stamp addition unit 902 acquires time stamp information from the time stamp generation unit 111 on the basis of the input sensor data. For example, the time stamp addition unit 902 acquires time stamp information at a sampling rate of the sensor or at a timing when the time stamp of the camera device is updated.

The data synchronization unit 903 synchronizes the captured video input by the image processing unit 11 and the sensor data. The synchronization method is the same as that used in the first exemplary embodiment, except that the sensor data is used in place of the video data. The data synchronization is achieved in accordance with the flowchart in FIG. 8.

As described above, according to the present exemplary embodiment, data synchronization is achieved by using the time stamp information about a captured video and the time stamp information about another sensor. In this way, the present exemplary embodiment is applicable to a case in which other sensor data different from a captured video is input, and can achieve data synchronization while reducing deterioration of the image quality of the captured video.

Thus, even when additional information is embedded into image data, the above configuration according to the present exemplary embodiment can prevent deterioration of the image quality.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium.') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-089723, filed Apr. 28, 2017, which is hereby incorporated by reference herein in its entirety.

What is claimed is:

1. An information processing apparatus comprising:
one or more processors; and
memory storing instructions that, when executed by the one or more processors, cause the information processing apparatus to perform operations including:
acquiring image data of a frame for each of a plurality of frames of video data captured in one captured video, wherein one frame of the plurality of frames of video data includes a plurality of pixels, each associated with input color difference signal data,
generating information about time as generated time information, and
replacing the input color difference signal data for more than one pixel of the plurality of pixels of the one frame with the generated time information, which are subsequently output as part of an output color difference signal data for the one frame of the one captured video.

2. The information processing apparatus according to claim 1,
wherein executing the instructions further causes the information processing apparatus to perform operations including generating a luminance signal and input color difference signal data based on the acquired image data, and
wherein replacing includes replacing data of the input color difference signal data at the plurality of pixels with the generated time information.

3. The information processing apparatus according to claim 1, wherein replacing includes replacing data at a plurality of pixels consecutive in a predetermined direction with the generated time information.

4. The information processing apparatus according to claim 3, wherein the predetermined direction is a raster direction of the image data.

5. The information processing apparatus according to claim 1, wherein generating includes generating information about time relating to timing at which the image data is acquired.

6. The information processing apparatus according to claim 1,
wherein the generated time information is data of a predetermined number of bits, and
wherein replacing includes replacing data at pixels of a predetermined number in the one frame with the generated time information.

7. The information processing apparatus according to claim 6, wherein replacing includes replacing data of a least significant bit of the data at the pixels of the predetermined number with one bit data of the generated time information.

8. The information processing apparatus according to claim 1,
wherein executing the instructions further causes the information processing apparatus to perform operations including performing image processing on the image data,
wherein performing incudes performing delay processing for delaying the generated time information based on a delay caused by execution of the image processing,
wherein replacing includes replacing data at a plurality of pixels of the acquired image data with the delayed generated time information, and
wherein the image data and the generated time information are input to the image processing at the same timing.

9. The information processing apparatus according to claim 1, wherein the one captured video is captured by a camera.

10. The information processing apparatus according to claim 9, further comprising the camera, wherein the camera is configured to capture the video data.

11. The information processing apparatus according to claim 1, wherein the information processing apparatus is configured to be worn around a head portion of a user when used.

12. The information processing apparatus according to claim 1,
wherein the image data includes first image data and second image data, and
wherein the generated time information about time is information for synchronizing the first and second image data.

13. An information processing apparatus comprising:
one or more processors; and
memory storing instructions that, when executed by the one or more processors, cause the information processing apparatus to perform operations including:
acquiring image data including first image data captured by a first capturing device and second image data captured by a second capturing device that is different from the first capturing device,
generating, as generated time information, information about time that relates to timing at which each of the first and second image data is acquired, wherein the generated time information is information for synchronizing the first and second image data at each pixel in the first and second image data, and
replacing data of input color difference signal data, among a luminance signal and the input color difference signal data, with the generated time information at a plurality of first pixels of the first image data in one frame and a plurality of second pixels of the second image data in another frame.

14. An information processing system comprising:
the information processing apparatus according to claim 1; and
an information processing apparatus configured to restore the generated time information from image data to which the generated time information has been added by the information processing apparatus.

15. The information processing system according to claim 14, wherein the information processing apparatus further is configured to generate synthesized image data by superimposing a computer graphics (CG) data on the image data.

16. An information processing system comprising:
the information processing apparatus according to claim 13; and
an information processing apparatus including a restoration device configured to restore the generated time information from image data to which the generated time information has been added by the information processing apparatus.

17. A method for an information processing apparatus, the method comprising:
acquiring image data of a frame for each of a plurality of frames of video data captured in one captured video, wherein one frame of the plurality of frames of video data includes a plurality of pixels, each associated with input color difference signal data;
generating information about time as generated time information; and
replacing the input color difference signal data for more than one pixel of the plurality of pixels of the one frame with the generated time information, which are subsequently output as part of an output color difference signal data for the one frame of the one captured video.

18. A method for an information processing apparatus, the method comprising:
acquiring image data including first image data captured by a first capturing device and second image data captured by a second capturing device that is different from the first capturing device;
generating, as generated time information, information about time that relates to timing at which each of the first and second image data is acquired, wherein the generated time information is information for synchronizing the first and second image data at each pixel in the first and second image data; and
replacing data of input color difference signal data, among a luminance signal and the input color difference signal data, with the generated time information at a plurality of first pixels of the first image data in one frame and a plurality of second pixels of the second image data in another frame.

19. A non-transitory computer-readable storage medium storing a program to cause a computer to perform a method for an information processing apparatus, the method comprising:
acquiring image data of a frame for each of a plurality of frames of video data captured in one captured video, wherein one frame of the plurality of frames of video data includes a plurality of pixels, each associated with input color difference signal data;

generating information about time as generated time information; and replacing the input color difference signal data for more than one pixel of the plurality of pixels of the one frame with the generated time information, which are subsequently output as part of an output color difference signal data for the one frame of the one captured video.

20. A non-transitory computer-readable storage medium storing a program to cause a computer to perform a method for an information processing apparatus, the method comprising:

acquiring image data including first image data captured by a first capturing device and second image data captured by a second capturing device that is different from the first capturing device;

generating, as generated time information, information about time that relates to timing at which each of the first and second image data is acquired, wherein the generated time information is information for synchronizing the first and second image data at each pixel in the first and second image data; and replacing data of input color difference signal data, among a luminance signal and the input color difference signal data, with the generated time information at a plurality of first pixels of the first image data in one frame and a plurality of second pixels of the second image data in another frame.

21. The information processing apparatus according to claim 1, wherein the plurality of pixels is four pixels per frame, and wherein the generated time information is time stamp information that is embedded in a least significant bits of the input color difference signal data at four pixels per frame such that, in a case the time stamp information is extracted, image quality of the image data is not significantly deteriorate.

22. The information processing apparatus according to claim 21, wherein the plurality of pixels and the input color difference signal data, into which the time stamp information is embedded to replace, are insensitive to human eyes.

23. The information processing apparatus according to claim 1, wherein the generated time information is of a predetermined bit number and is dispersedly embedded to replace at pixels of a predetermined positions number, and wherein the generated time information is embedded to replace a least significant bit at each pixel position.

24. The information processing apparatus according to claim 1, wherein a value of each of two input color difference signal data is 0x6D and replacing the input color difference signal data for more than one pixel for the one frame includes replacing each 0x6D value of the two input color difference signal data with a 0x6C value of the generated time information.

25. The information processing apparatus according to claim 1, wherein a head-mounted display corresponds to the information processing apparatus.

* * * * *